(12) United States Patent
Ruder

(10) Patent No.: US 8,172,285 B2
(45) Date of Patent: May 8, 2012

(54) MOUNTING SYSTEM FOR ATTACHMENT OF A BUMPER COVERING

(75) Inventor: Jürgen Ruder, Kösching (DE)

(73) Assignee: Peguform GmbH, Bützingen (DE)

( * ) Notice: Subject to any disclaimer, the term of this patent is extended or adjusted under 35 U.S.C. 154(b) by 0 days.

(21) Appl. No.: 12/891,427

(22) Filed: Sep. 27, 2010

(65) Prior Publication Data

US 2011/0080012 A1    Apr. 7, 2011

(30) Foreign Application Priority Data

Oct. 1, 2009   (DE) .................... 20 2009 013 150 U

(51) Int. Cl.
*B60R 19/44*   (2006.01)

(52) U.S. Cl. ...... 293/120; 293/155; 296/29; 296/193.09
(58) Field of Classification Search ............ 296/187.09, 296/193.09, 29, 198; 293/102, 120, 155
See application file for complete search history.

(56) References Cited

U.S. PATENT DOCUMENTS

| | | | | |
|---|---|---|---|---|
| 3,894,316 | A | * | 7/1975 | Johnson ........................ 403/338 |
| 5,061,108 | A | * | 10/1991 | Bien et al. ........................ 403/24 |
| 5,882,054 | A | * | 3/1999 | Devilliers et al. ............. 293/155 |
| 6,135,517 | A | * | 10/2000 | Cordebar ....................... 293/155 |
| 6,715,764 | B2 | * | 4/2004 | Delavalle et al. ................ 276/29 |
| 6,769,727 | B2 | * | 8/2004 | Delavalle et al. ................ 296/29 |
| 7,144,059 | B2 | * | 12/2006 | Pfister et al. .................... 296/29 |
| 7,258,383 | B2 | * | 8/2007 | Pfister et al. .................... 296/29 |
| 7,488,032 | B2 | * | 2/2009 | Thakar et al. ................ 296/198 |
| 2002/0091199 | A1 | * | 7/2002 | Babb et al. ..................... 525/194 |

FOREIGN PATENT DOCUMENTS

| | | |
|---|---|---|
| DE | 197 41 062 A1 | 4/1999 |
| DE | 199 12 267 A1 | 8/1999 |
| DE | 101 47 621 A1 | 4/2003 |
| DE | 10 2005 029 544 A1 | 1/2007 |
| EP | 1 516 804 A2 | 6/2004 |

* cited by examiner

*Primary Examiner* — Glenn Dayoan
*Assistant Examiner* — Gregory Blankenship
(74) *Attorney, Agent, or Firm* — Ursula B. Day

(57) ABSTRACT

The invention refers to a mounting system for attachment of a bumper covering at a motor vehicle body which includes a mounting strip, a guide profile and a locking slider which in mounted condition provides connection between the mounting strip and the guide profile, wherein at least the guide profile is configured as a separate component.

9 Claims, 3 Drawing Sheets

MOUNTING SYSTEM FOR ATTACHMENT OF A BUMPER COVERING

CROSS-REFERENCES TO RELATED APPLICATIONS

This application claims the priority of German Patent Application Serial No. 20 2009 013 150.5, filed October 2009, pursuant to 35 U.S.C. 119(a)-(d), the subject matter of which is incorporated herein by reference.

BACKGROUND OF THE INVENTION

The present invention relates to a mounting system for the attachment of bumper covering, and in particular to a mounting system that includes a mounting strip, a guide profile and a locking slider.

In DE 199 12 267 A1, a snap-in device is described, in particular for connecting a bumper covering to the fender of an automobile where the first component is provided with several stop bolts distanced from each other and the second component is provided with a lock-in strip with corresponding lock-in openings for a mutual snap-in connection. With this arrangement, it is possible to reduce the assembly time for mounting the bumper covering, however the snap-in connection itself it relatively complex and constructed in a costly manner in order to realize a connection that can be subjected to high stress.

In DE 10 2005 029 544 A1, a connection device is described for the attachment of a bumper component having a receiving groove for receiving an mounting strip extending along the bumper lateral component and a snap-in element disposed in the receiving groove which co-operate with snap-in windows of the mounting strip, wherein the geometry of the connection device is configured such that defined forces of actuating and control of the snap-in element are preprogrammed for snapping in and snapping out, in case of a crash. In order to realize the control of the action, relatively many requirements for the design and configuration are demanded from the connection device, which contributes to the time and cost of the production.

In DE 197 41 062 A1, a multiple function track is described for the secure and form-fitting mounting, aligning and fixing of motor vehicle body components. These multiple function tracks are pre-mounted at the corresponding component and provided with receiving openings in the form of key holes, into which attachment bolts that are fixed at the body engage during assembly. This connection device also has a design which makes it quite expensive.

In general, all snap-in connections suffer from the drawback that the more the device can withstand stress, the more difficult it is to disassemble.

Thus, the problem remains to provide a mounting system for components of motor vehicles which permit a simple and fast assembly of the components and at the same time fulfill the requirements for quality relative to joint measurements and tolerances. In addition, the assembly and disassembly should be easy to carry out with few hand movements and without the need for specialized tools.

It would therefore be desirable and advantageous to provide an improved mounting system that allows simple manufacture while using inexpensive materials and still reliably coping with loads and strain in the connection between bumper and motor vehicle body.

SUMMARY OF THE INVENTION

According to one aspect of the present invention, the mounting system for attachment of a bumper covering to a motor vehicle includes: a mounting strip disposed at the bumper covering and having receiving openings for engagement with attachment devices, a guide profile for attachment to the body of a motor vehicle having attachment devices corresponding to the receiving openings in the mounting strip, and a locking slider for realizing a locking connection between the mounting strip and the guide profile during assembly by engaging the attachment devices into the corresponding receiving openings, and wherein at least the guide profile and the locking slider are configured as separate components.

The present invention resolves prior art problems by providing a mounting system that includes a mounting strip that has openings for receiving therein corresponding attachment devices. The system further includes a guide profile. The guide profile is provided with attachment means which engage with the receiving openings of the mounting strip. The mounting strip is combined with a locking slider which, upon assembly, provides a connection between the mounting strip and the guide profile. The guide profile and the locking bar slider are configured as separate components, while the mounting strip can be directly formed onto the bumper covering or configured as a separate component for clipping to the bumper covering.

According to another aspect of the invention the attachment devices of the guide profile are configured as projecting hooks, projecting pockets and engagement slots.

According to yet another aspect, during assembly, the mounting strip which includes openings for receiving the attachment devices of the guide profile is first combined with the locking slider with means necessary for providing a firm connection with the mounting strip such as for example by clamping or clipping the locking slider to the mounting strip. In addition, the locking slider is provided with locking means for engaging the attachment devices of the guide profile. The locking means include locking tongues, which engage with the projecting pockets of the guide profile, and locking webs which interact with the locking hooks of the guide profile.

When mounting the bumper covering, the guide profile is first fastened to the body of the motor vehicle and parallel thereto, the locking slider is clamped or clipped to the mounting strip. If the mounting strip is configured as a separate component, it must first be clamped to the bumper covering.

In a preferred embodiment of the present invention, a bumper covering of the type where the mounting strip is already formed directly at the bumper covering is utilized. Subsequently, the bumper covering is slid onto the guide profile at the vehicle body such that the locking slider is moved downwardly until the locking tongues of the locking bar slider engage with the pocket-shaped locking devices of the attachment profile, while the locking webs of the locking slider interact with the locking hooks of the attachment profile for operative engagement to thereby afix the bumper covering to the vehicle body.

Dismounting this assembly is realized by simply pulling out the locking bar slider and then removing the bumper covering from the vehicle body.

The advantages of this arrangement are the simplicity and efficiency of the mounting system. In particular, with the system according to the present invention, an exact fit of the components can be realized relative to the X-, Y- and Z-directions, wherein the Y-direction is considered the driving direction and the X-direction extends perpendicular to the driving direction and the Y-direction extends in vertical direction up and down. The mounting system is arranged so that, prior to the installation of the rear and/or front lights, all components are easily accessible from the exterior through the openings for the lights, and most of all, requiring no additional tools for the assembly itself, since a firm and secure connection between bumper covering and the vehicle body is realized with the locking slider.

The components of the mounting system, in particular, the mounting strip and the guide profile are advantageously made from thermoplastic material selected from the group of polypropylene (PP), polyethylene (PE), polyamide (PA), polystyrene, (PS) polyvinyl chloride (PVC) polycarbonate (PC) polybutylene terephthalate (PBT), polyacrylonitrile (PAN) polymethylmethacrylate (PMMA), acrylonitrile butadiene stryrene (ABS), acrylonitrile butadiene styrene polycarbonate co-polymerisate (ABS-PC) polyvinyl ether, styrene acrylonitrile (SAN), and/or polyoxymethylene (POM) and are produced by injection molding. An advantageous embodiment of the mounting system according to the present invention provides that the locking slider is made from metal via a cold-work process.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
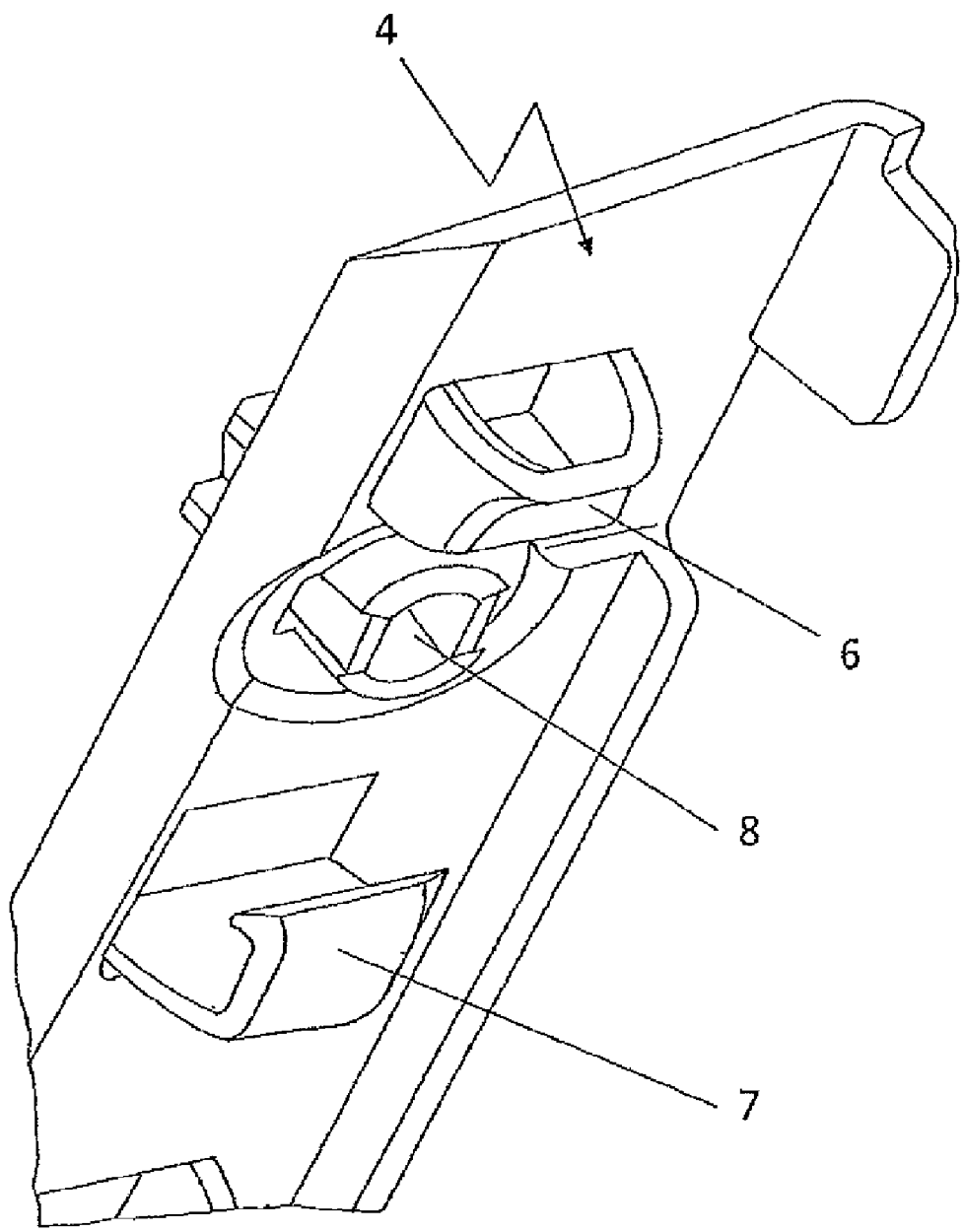
FIG. 1 is a perspective view of a detail of the guide profile according to the present invention.

Throughout all the Figures, same or corresponding elements are generally indicated by same reference numerals.

Turning now to the drawing, and in particular to FIG. 1, there is shown a perspective illustration of a detail of guide profile 4 which shows the different attachment devices comprising the projecting pocket 6, the locking hook 7, and attachment opening 8.

The guide profile 4 shown in FIG. 1 is then fastened to the body of the motor vehicle via one or more attachment openings 8, while the projecting pockets 6 and the locking hooks 7 are provided for receiving the corresponding locking devices of the locking slider 5. The fastening of the guide profile to the motor vehicle body 2 is carried out, for example, through screw connections, wherein screws are threaded through the attachment openings 8. At the rear side of the guide profile 4 in FIG. 1 in the area of the attachment openings 8, another projection is seen, which, for example, engages with a corresponding receiving opening at the motor vehicle body 2. The guide profile 4 is preferably made from a thermoplastic material.

Figure 2:
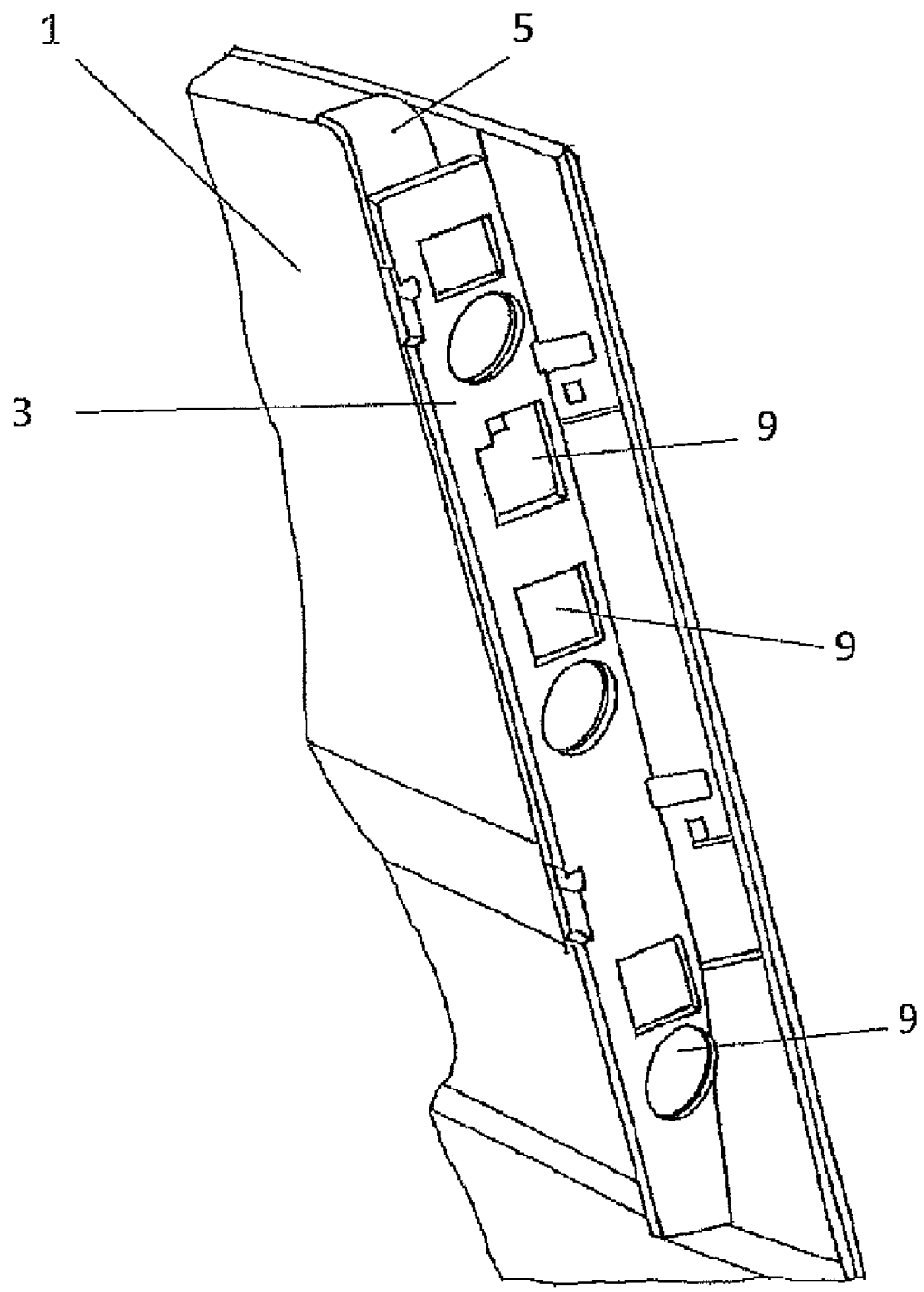
FIG. 2 is a perspective view of a detail of the bumper covering with the mounting strip.

FIG. 2 shows a mounting strip 3 which operates in connection with the guide profile 4 through corresponding receiving openings 9 for the attachment devices 6, 7 and 8 of the guide profile 4. Depending on the embodiment of the present invention, the mounting strip 3 is either directly formed at the bumper covering 1 or it is clamped or clipped onto the bumper covering 1 as a separate component. At the rear side of the mounting strip 3, the clamped or clipped on locking slider 5 is seen, which, in the present illustration is in an unlocked position such that the attachment openings 9 of the mounting strip are open and ready to receive the attachment devices 6, 7, 8 of the guide profile 4.

Figure 3:
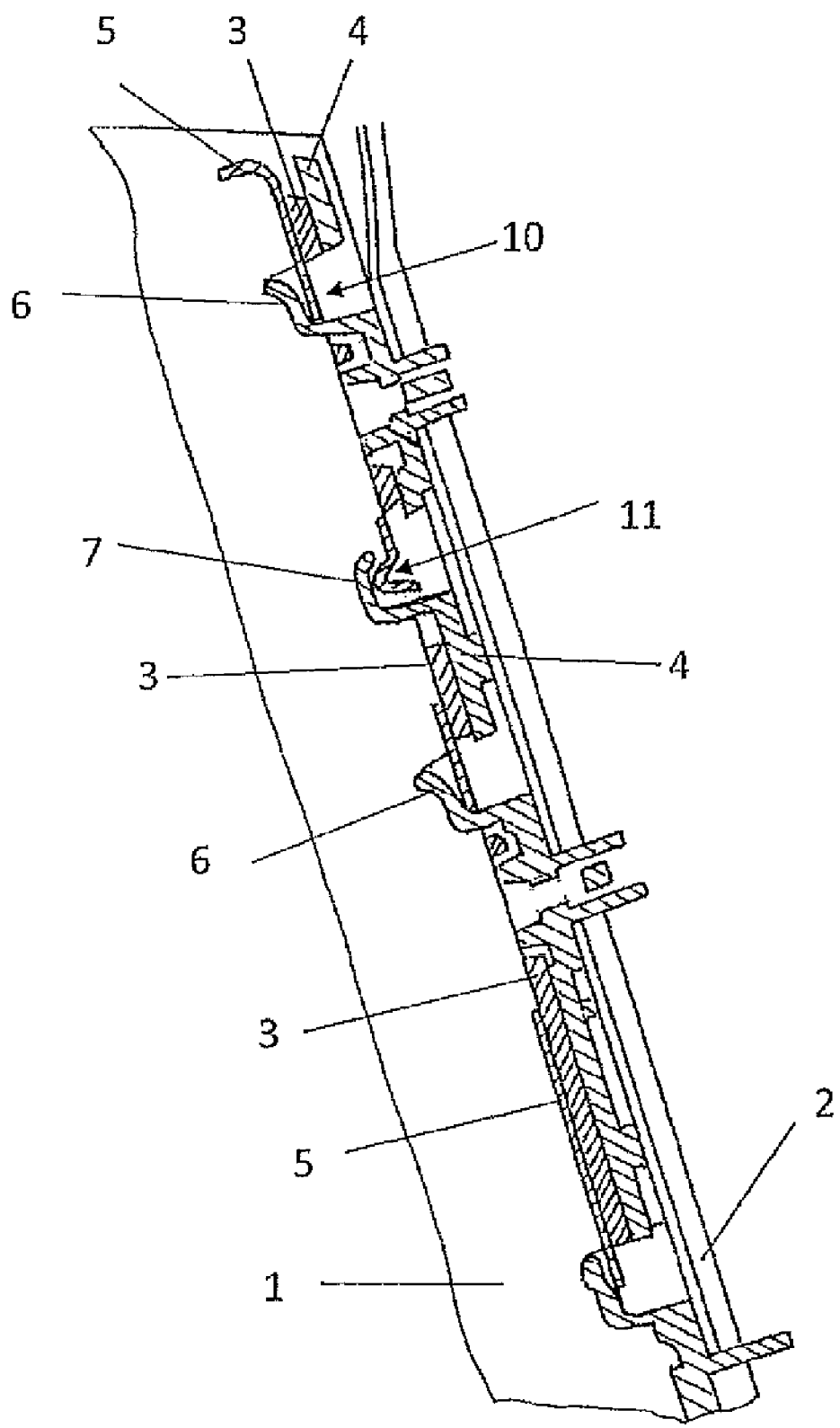
FIG. 3 is section of the mounting system seen in mounted condition.

FIG. 3 shows a section through the entire mounting system in mounted condition, where it is shown that the guide profile 4 is directly placed at the motor vehicle body 2 and with a type of guide engages in the area of attachment openings 8 in corresponding receiving openings in the motor vehicle body 2. The mounting strip 3 rests directly at the guide profile 4 such that the attachment devices 6, 7, 8 of the guide profile 4 penetrate the receiving openings 9 of the mounting strip 3. The entire mounting system is secured by locking slider 5 which engages with its locking tongues 10 the projecting pocket 6 of the guide profile 4, while the locking web 11 of the locking slider 5 operatively engages with the locking hooks 7 of the guide profile 4.

While the invention has been illustrated and described as embodied in a mounting system for a bumper covering, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A mounting system for the attachment of a bumper covering to a motor vehicle comprising:
    a mounting strip disposed at the bumper covering and having receiving openings for engagement with attachment devices,
    a guide profile for attachment to the body of a motor vehicle via separate attachment means, said guide profile having attachment devices corresponding to the receiving openings in the mounting strip, and
    a separate slider locking bar having receiving openings for realizing a locking attachment connection to the mounting strip and the guide profile, said slider locking bar is located between the mounting strip and the guide profile when assembled, wherein during assembly the attachment devices are operatively engaged in the corresponding receiving openings, wherein at least the guide profile and the slider locking bar are configured as separate components.

2. The mounting system of claim 1, wherein the mounting strip is formed directly at the bumper covering.

3. The mounting system of claim 1, wherein the mounting strip is configured as a separate component for clipping onto the bumper covering.

4. The mounting system of claim 1, wherein the attachment devices of the guide profile are selected from the group consisting of projecting hooks, projecting pockets and engagement slots.

5. The mounting system of claim 1, wherein the slider locking bar is provided with means for clipping or clamping onto the mounting bar.

6. The mounting system of claim 1, wherein the slider locking bar is provided with locking devices for engagement with the corresponding attachment devices of the guide profile.

7. The mounting system of claim 6, wherein the locking devices include locking tongues for engagement with projecting pockets and locking webs for operable engagement with projecting hooks.

8. The mounting device according to claim 1, wherein the components of the mounting system each are injection molded from thermoplastic material selected from the group consisting of polypropylene (PP), polyethylene (PE), polyamide (PA), polystyrene, (PS) polyvinyl chloride (PVC) polycarbonate (PC) polybutylene terephthalate (PBT), polyacrylonitrile (PAN) polymethylmethacrylate (PMMA), acrylonitrile butadiene stryrene (ABS), acrylonitrile butadiene styrene polycarbonate co-polymerisate (ABS-PC) polyvinyl ether, styrene acrylonitrile (SAN), and/or polyoxymethylene (POM).

9. The mounting device of claim 1, wherein the slider locking bar is made from metal by a cold working method.

* * * * *

UNITED STATES PATENT AND TRADEMARK OFFICE
CERTIFICATE OF CORRECTION

| | | |
|---|---|---|
| PATENT NO. | : 8,172,285 B2 | Page 1 of 1 |
| APPLICATION NO. | : 12/891427 | |
| DATED | : May 8, 2012 | |
| INVENTOR(S) | : Jürgen Ruder | |

It is certified that error appears in the above-identified patent and that said Letters Patent is hereby corrected as shown below:

Title Page
[73] Assignee: change city of residence "Bützingen" to --Bötzingen--.

Signed and Sealed this
Second Day of October, 2012

David J. Kappos
*Director of the United States Patent and Trademark Office*